(12) United States Patent
Pearson et al.

(10) Patent No.: US 10,592,477 B2
(45) Date of Patent: Mar. 17, 2020

(54) PERFORMING AUTHENTICATED WRITES ACROSS AGGREGATE STORAGE VOLUMES

(71) Applicant: Intel Corporation, Santa Clara, CA (US)

(72) Inventors: Adrian R. Pearson, Beaverton, OR (US); Jawad B. Khan, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 15/636,788

(22) Filed: Jun. 29, 2017

(65) Prior Publication Data
US 2019/0005063 A1  Jan. 3, 2019

(51) Int. Cl.
*G06F 16/182* (2019.01)
*G06F 21/64* (2013.01)
*G06F 11/16* (2006.01)
*G06F 12/02* (2006.01)
*G06F 12/06* (2006.01)
*H04L 29/08* (2006.01)

(52) U.S. Cl.
CPC ...... *G06F 16/1844* (2019.01); *G06F 11/1662* (2013.01); *G06F 12/023* (2013.01); *G06F 12/0646* (2013.01); *G06F 21/645* (2013.01); *H04L 67/1097* (2013.01)

(58) Field of Classification Search
CPC combination set(s) only.
See application file for complete search history.

(56) References Cited

U.S. PATENT DOCUMENTS

| | | | |
|---|---|---|---|
| 2002/0194209 A1 | 12/2002 | Bolosky et al. | |
| 2008/0294696 A1 | 11/2008 | Frandzel | |
| 2009/0216910 A1* | 8/2009 | Duchesneau | G06F 9/5072 709/250 |
| 2010/0062844 A1 | 3/2010 | Crowder, Jr. et al. | |
| 2011/0125771 A1* | 5/2011 | Gladwin | G06F 21/602 707/758 |
| 2011/0311051 A1* | 12/2011 | Resch | H04L 63/06 380/270 |

(Continued)

OTHER PUBLICATIONS

International Patent Application No. PCT/US2016/022295, entitled "Data Storage System Connectors With Parallel Array of Dense Memory Cards and High Airflow", filed on Mar. 14, 2016, 39 pages.

(Continued)

*Primary Examiner* — Shyue Jiunn Hwa
(74) *Attorney, Agent, or Firm* — Jordan IP Law, LLC

(57) ABSTRACT

Systems, apparatuses and methods may provide for technology that digitally signs a hash table and a data payload, wherein the data payload is partitioned into a plurality of storage blocks and the hash table specifies how to index into and individually authenticate the plurality of storage blocks. Additionally, a write of the digitally signed hash table and data payload may be initiated to an aggregate storage array. In one example, the aggregate storage array authenticates the digital signature of the hash table and the data payload and conducts a write of the data payload to a plurality of drives in the aggregate storage array in accordance with the hash table.

24 Claims, 4 Drawing Sheets

(56) References Cited

U.S. PATENT DOCUMENTS

| | | | | |
|---|---|---|---|---|
| 2014/0325259 A1* | 10/2014 | Resch | ................. | G06F 11/1076 |
| | | | | 714/6.2 |
| 2015/0288680 A1* | 10/2015 | Leggette | ............ | G06F 21/6218 |
| | | | | 726/6 |
| 2016/0191250 A1 | 6/2016 | Bestler et al. | | |
| 2017/0103225 A1 | 4/2017 | Pearson et al. | | |
| 2017/0208125 A1* | 7/2017 | Jai | ....................... | H04L 67/1097 |

OTHER PUBLICATIONS

U.S. Appl. No. 150/68,827, entitled "Data Storage System With Parallel Array of Dense Memory Cards and High Airflow", filed Mar. 14, 2016, 27 pages.

"Hash table", retrieved from en.wikipedia.org/wiki/hash_table, retrieved on May 21, 2107, 16 pages.

"OpenStack: The Path to Cloud", retrieved from openstack.org, 39 pages.

"TCG Storage Opal SSC Feature Set: PSK Secure Messaging", TCG Storage, Aug. 5, 2015, 17 pages.

Weil et al., "CEPH: A Scalable, High-Performance Distributed File System", OSDI '06: 7th USENIX Symposium on Operating Systems Design and Implementation, 14 pages.

European Search Report for European Patent Application No. 18174968.0, mailed Oct. 17, 2018, 8 pp.

* cited by examiner

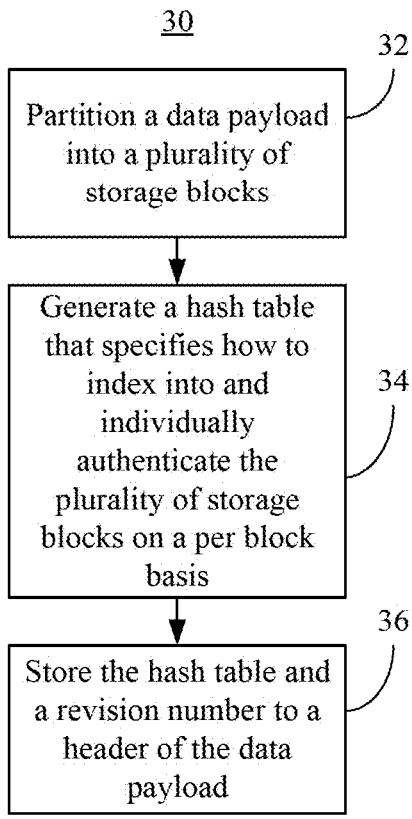
FIG. 3A
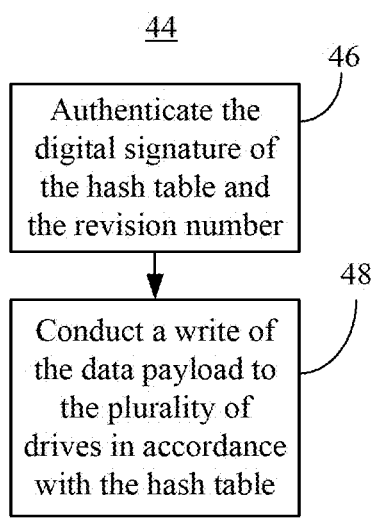
FIG. 3C
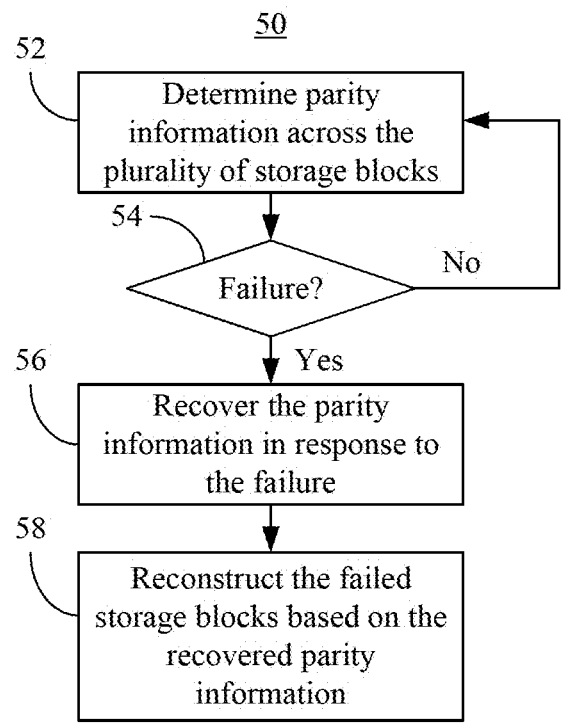
FIG. 3B
FIG. 3D

PERFORMING AUTHENTICATED WRITES ACROSS AGGREGATE STORAGE VOLUMES

TECHNICAL FIELD

Embodiments generally relate to memory structures.

BACKGROUND

Storage of public and private cloud data may involve the use of authenticated writes to a storage platform. For example, authentication may be achieved via a bidirectional encrypted session between two verified endpoints (e.g., a cloud service provider and the storage platform). Such an approach may be relatively complex, inefficient and/or costly.

BRIEF DESCRIPTION OF THE DRAWINGS

The various advantages of the embodiments will become apparent to one skilled in the art by reading the following specification and appended claims, and by referencing the following drawings, in which:

FIG. 3A is a flowchart of an example of a method of operating an application processor according to an embodiment;

FIG. 3B is a flowchart of an example of a method of operating a signature server according to an embodiment;

FIG. 3C is a flowchart of an example of a method of operating an aggregate storage array according to an embodiment;

FIG. 3D is a flowchart of a method of handling drive failures according to an embodiment;

DESCRIPTION OF EMBODIMENTS

Figure 1:
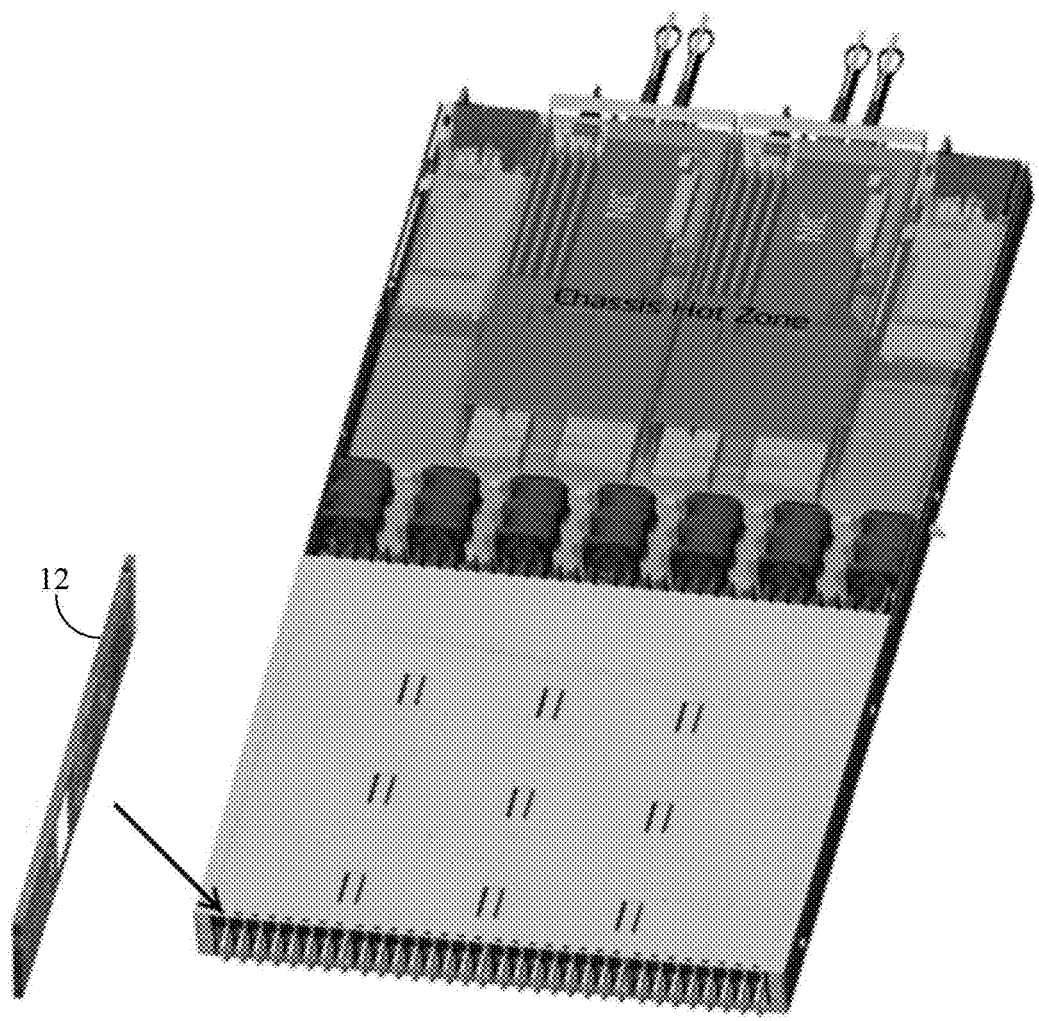
FIG. 1 is a perspective view of an example of an aggregate storage array according to an embodiment.

Turning now to FIG. 1, an aggregate storage array 10 is shown, wherein the aggregate storage array 10 includes a plurality of storage devices 12. In one example, the aggregate storage array 10 is an all-flash array (AFA), a redundant array of independent disks (RAID), etc., and each storage device ("drive") 12 is a solid state drive (SSD). The aggregate storage array 10 may be used to store data payloads such as, for example, financial data (e.g., digitized loan documents), boot images (e.g., for a tenant of a cloud service provider), and so forth. In this regard, the aggregate storage array 10 may replicate data and/or correct errors on a storage block basis, wherein the block size may vary depending on the circumstances (e.g., 256 Kilobytes (KB), 512 KB, 4 Megabytes (MB)).

As will be discussed in greater detail, writes to the aggregate storage array 10 may be authenticated (e.g., to prevent tampering or other unauthorized modifications of the data payloads) in a manner that does not involve a bidirectional encrypted session between each storage device 12 and another verified endpoint (e.g., the entity/component attempting the write operation). More particularly, the data payloads may be partitioned into storage blocks (e.g., pages) that are compatible with the data replication policy and error correction policy (e.g., error correction code/ECC) of the aggregate storage array 10. Additionally, a hash table may be generated to specify how to index into and individually authenticate the storage blocks on a per block basis, wherein the aggregate storage array 10 authenticates a digital signature applied to the hash table.

In one example, the hash table is authenticated on the per block basis by each storage device 12 (e.g., at the drive level) of the aggregate storage array 10. Accordingly, the hash table may be used to narrow down the data authentication granularity to a single block within the plurality of blocks. Such an approach may enable authentication of the entire data payload to be avoided. The illustrated aggregate storage array 10 therefore provides a relatively simple, efficient and low cost solution to conducting authenticated writes. The array 10 may include one or more network interface cards (NICs), switch nodes and/or processors (e.g., compute nodes in a chassis "hot zone") that facilitate modular connectivity to the storage devices 12. Each storage device 12 may be, for example, relatively thin and long (e.g., nineteen inches) ruler shaped SSD (RSSD). In such a case, the aggregate storage array 10 might include thirty-two RSSDs positioned at the front of the aggregate storage array 10 and coupled to the chassis hot zone at the rear of the aggregate storage array 10. The SSDs may therefore be aggregated and presented to a host as a single device to achieve greater storage density.

The aggregate storage array 10 may be used for a NAND flash memory, three-dimensional (3D) NAND memory array devices, or other memory devices. Non-volatile memory is a storage medium that does not require power to maintain the state of data stored by the medium. In one embodiment, the storage devices 12 are block addressable memory devices, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Figure 2:
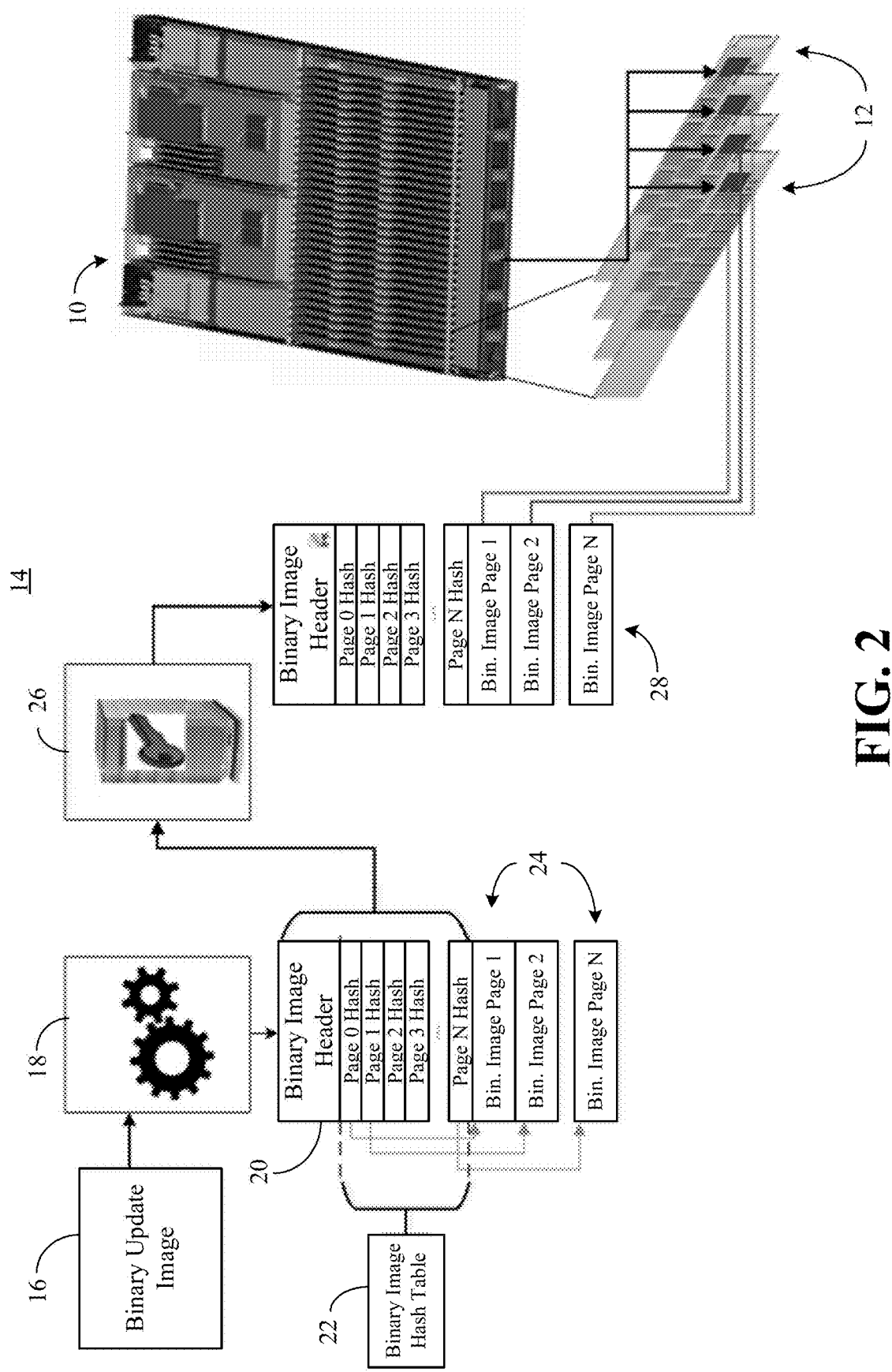
FIG. 2 is an illustration of an example of an authenticated write architecture according to an embodiment.

FIG. 2 shows an authenticated write architecture 14 in which a binary update image 16 (e.g., data payload) is sent to an application processor 18 (e.g., host processor incorporated into a semiconductor package apparatus, chip, die), which partitions the binary update image 16 into a plurality of storage blocks 24 (e.g., pages in the illustrated example) and generates (e.g., prefixes) a header 20 that contains a hash table 22. The header 20 may also include other security metadata such as, for example, key information (e.g., data at rest protection keys, public signature verification keys), revision control information (e.g., revision number), encryption algorithm information, and so forth.

A signature server 26 may digitally sign the hash table 22 to obtain a signed image 28. The signed image 28 may be sent to a logical volume (e.g., namespace) in the aggregate storage array 10 via, for example, one or more NICs of the aggregate storage array 10. Additionally, the hash table 22 may be distributed to each of the storage devices 12 via, for example, a switch node and/or processor/compute node of the aggregate storage array 10. In this regard, if the storage devices 12 are self-encrypting drives (SEDs) that include built-in high speed encryption controllers/engines, encryption operations may be offloaded to the storage devices 12 while sharing the same encryption key across multiple storage devices 12 (e.g., facilitating a "horizontal namespace"). Thus, the hash table 22 may be authenticated at the drive level of the array 10, as will be discussed in greater detail. Upon successful authentication, storage blocks may be distributed to different storage devices 12 or replicated across multiple storage devices 12.

Each storage device 12 may be ECC protected, with all dies (e.g., NVM dies) within a particular storage device 12 also having XOR protection against die level failure. At the array level, any suitable data reliability and failure recovery solution (e.g., RAID Level 5 or 6) may be used. The compute nodes (e.g., located in the chassis hot zone of FIG. 1) may perform RAID operations and manage the key information that is replicated across all of the storage devices 12 so that removal of one storage device 12 does not preclude operation of the entire aggregate storage array 10.

As already noted, the signed image 28 may be sent (e.g., addressed) to a namespace (e.g., logical volume, not shown) in the aggregate storage array 10. More particularly, the authenticated write may reference a single namespace that spans multiple storage devices 12 in the aggregate storage array 10. Such an approach may ease tenant migration from one system to another. For example, the single namespace might be allocated to a client and seamlessly migrated from system to system as appropriate. Additionally, a single key may be shared across multiple aggregate storage arrays 10. Accordingly, upon migration the storage devices 12 may return cipher text instead of plaintext, so that the entire encrypted state is recreated in the new system. The application processor 18, the signature server 26 and/or the aggregate storage array 10 may be located on the same or different systems/platforms as appropriate. For example, the application processor 18 and the signature server 26 may be located within a hardware security module (HSM) of a data center that includes the aggregate storage array 10. In yet another example, the application processor 18, the signature server 26 and the aggregate storage array 10 may each be remote from one another.

FIG. 3A shows a method 30 of operating an application processor. The method 30 may generally be implemented in an application processor such as, for example, the application processor 18 (FIG. 2), already discussed. More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 30 may be written in any combination of one or more programming languages, including an object oriented programming language such as Java, Smalltalk, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for partitioning a data payload into a plurality of storage blocks. The storage blocks may be compatible with the block size supported by the data replication policy and/or error correction policy of an aggregate storage array. The data replication policy may generally dictate how individual storage blocks are copied across the drives of the aggregate storage array to enhance resiliency through redundancy. The error correction policy may generally dictate how individual storage blocks are checked for errors (e.g., via parity information) and how errors are remedied (e.g., via recovery of redundant storage blocks). The policies may be documented and/or maintained in any suitable data structure and/or storage medium associated with the array.

A hash table may be generated at processing block 34, wherein the hash table specifies how to index into and individually authenticate the plurality of storage blocks on a per block basis. More particularly, the hash table may use a hash function to compute an index into the storage blocks, from which a target value can be found. Thus, processing block 34 may include generating a hash for each storage block and placing the hashes of all of the storage blocks into the hash table/header. Illustrated processing block 36 stores the hash table to a header (e.g., prefix) of the data payload. Processing block 36 may also provide for storing other security metadata such as, for example, key information, revision control information (e.g., revision number), encryption algorithm information, etc., to the header.

FIG. 3B shows a method 38 of operating a signature server. The method 38 may generally be implemented in a signature server such as, for example, the signature server 26 (FIG. 2), already discussed. More particularly, the method 38 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated processing block 40 digitally signs the hash table and the revision number. Processing block 42 may initiate a write of the digitally signed hash table and revision number to the aggregate storage array. Processing block 42 may include injecting the signed image into the aggregate storage array, wherein the injection references a single namespace that spans multiple drives in the aggregate storage array.

FIG. 3C shows a method 44 of operating an aggregate storage array. The method 44 may generally be implemented in an aggregate storage array such as, for example, the aggregate storage array 10 (FIGS. 1-2), already discussed. More particularly, the method 44 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 46 provides for authenticating the digital signature of a hash table and a revision number. In one example, processing block 46, which may use a public signature verification key, authenticates the hash table on a per block basis at the drive level of the aggregate storage array. In such a case, the compute nodes of the aggregate storage array may distribute/forward the hash table to the drives without resigning the hash table. Such an approach may significantly enhance efficiency. In one example, the authentication is conducted at least partly based on the signed revision number in the header of the data payload. In this regard, the plurality of drives may ensure that the signed revision number is greater than or equal to the current security version number. Such an approach may prevent unauthorized rollback to a previous version of a signed data payload.

Processing block 48 may conduct a write of portions of the data payload to the plurality of drives in accordance with the hash table. More particularly, processing block 48 may place any number of storage blocks (e.g., pages) of payload data into any one of the plurality of drives that contain the verified hash table, without resigning the storage blocks. Thus, processing block 48 may distribute storage blocks to different drives and/or replicate storage blocks across multiple drives. Moreover, processing block 48 may be repeated for subsequent writes of one or more additional storage blocks (e.g., pages) to the aggregate storage array in accordance with the hash table. For example, as additional storage blocks become available, the same relatively small hash table may be used to authenticate any number of storage blocks received. As already noted, processing block 48 may include replicating one or more storage blocks across multiple drives in the aggregate storage array. An example data payload header may include, but is not limited to: key information, revision control information, encryption algorithm information, etc., or any combination thereof.

FIG. 3D shows a method 50 of handling drive failures. The method 50 may generally be implemented in an aggregate storage array such as, for example, the aggregate storage array 10 (FIGS. 1-2), already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 52 determines parity information across the plurality of storage blocks. The parity information may be determined by, for example, conducting an XOR computation over the affected pages (RAID 5), conducting an ECC based computation, and so forth. A determination may be made at processing block 54 as to whether a failure has occurred in one or more drives in the aggregate storage array. Processing block 54 may use a suitable ECC process on a per storage block basis. If a failure is detected, the parity information may be recovered at processing block 56 in response to the failure. Additionally, the storage block(s) in the drive(s) containing the failure may be reconstructed at processing block 58 based on the recovered parity information. More particularly, if a drive fails, the processing block 58 may unlock the remaining drives and rebuild the parity information in the new drive. In addition, the processing block 58 may provision the new drive with the appropriate public signature verification keys and data at rest protection keys. The provisioning operation may be protected through a bi-directional authentication mechanism with pre-provisioned certificates or pre-shared keys. If no failure is detected at processing block 54, the illustrated method returns to processing block 52.

Figure 4:
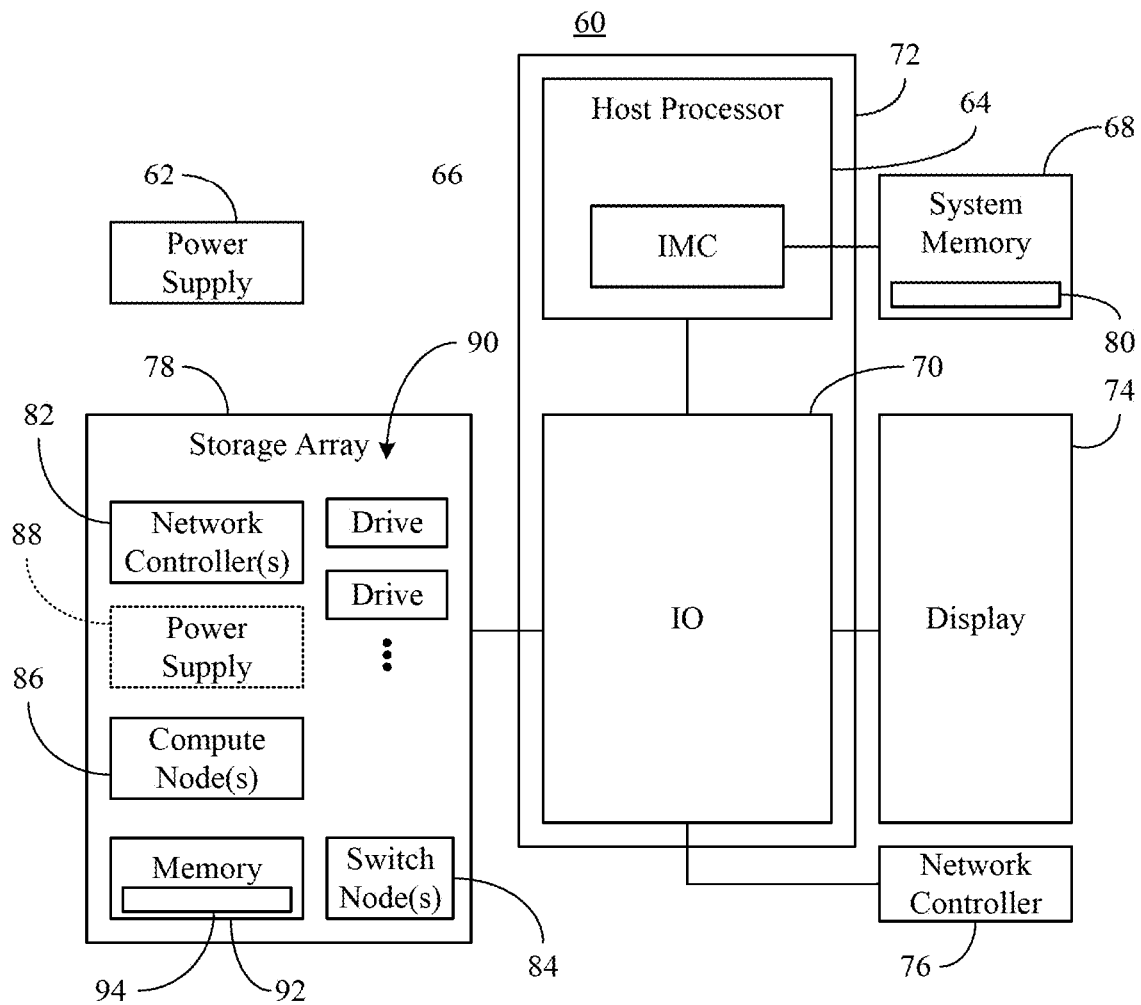
FIG. 4 is a block diagram of an example of a security-enhanced computing system according to an embodiment.

Turning now to FIG. 4, a security-enhanced computing system 60 is shown. The computing system 60 may generally be part of an electronic device/platform having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 60 includes a power supply 62 to provide power to the system 60 and a host processor 64 (e.g., central processing unit/CPU) having an integrated memory controller (IMC) 66 that is coupled to a system memory 68.

The illustrated system 60 also includes an input output (10) module 70 implemented together with the processor 64 on a semiconductor die 72 as a system on chip (SoC), wherein the IO module 70 functions as a host device and may communicate with, for example, a display 74 (e.g., touch screen, liquid crystal display/LCD, light emitting diode/LED display), a network controller 76, and an aggregate storage array 78 (e.g., AFA, RAID). The illustrated system memory 68 includes a set of instructions 80, which when executed by the host processor 64, cause the system 60 to perform one or more aspects of the method 30 (FIG. 3A) and/or the method 38 (FIG. 3B). Thus, the host processor 64 may function as an application processor and/or signature server that outputs digitally signed data payloads and hash tables as described herein. The instructions 80 may also be implemented in a semiconductor package apparatus (e.g., chip, die) as configurable logic and/or fixed-functionality hardware logic.

The aggregate storage array 78 may include one or more network controllers 82 (e.g., NICs), one or more switch nodes 84, one or more compute nodes 86 and a plurality of drives 90 (e.g., SSDs). The network controller(s) 82 may receive a hash table and a data payload, wherein the data payload is partitioned into a plurality of storage blocks and the hash table specifies how to index into and individually authenticate the plurality of storage blocks. The aggregate storage array 78 may also include a local memory 92 that stores a set of instructions 94, which when executed by the compute node(s) 86, cause the drives 90 of the aggregate storage array 78 to perform one or more aspects of the method 44 (FIG. 3C) and/or the method 50 (FIG. 3D), already discussed. Thus, the array 78 may authenticate the hash table and data payload, and write the data payload to the drives 90, as described herein. The instructions 94 may also be implemented in a semiconductor package apparatus (e.g., chip, die) as configurable logic and/or fixed-functionality hardware logic. The illustrated aggregate storage array 78 also includes a power supply 88 to provide power to the aggregate storage array 78, although the system power supply 62 may alternatively provide power to the aggregate storage array 78.

Figure 5:
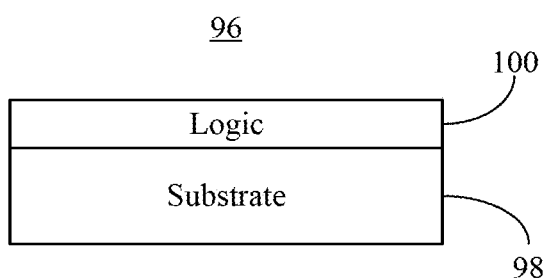
FIG. 5 is an illustration of an example of a semiconductor package apparatus according to an embodiment.

FIG. 5 shows a semiconductor package apparatus 96 (e.g., chip, die) that includes a substrate 98 (e.g., silicon, sapphire, gallium arsenide) and logic 100 (e.g., transistor array and other integrated circuit/IC components) coupled to the substrate 98. The logic 100, which may be implemented in configurable logic and/or fixed-functionality logic hardware, may generally implement one or more aspects of the method 30 (FIG. 3A), the method 38 (FIG. 3B), the method 44 (FIG. 3C) and/or the method 50 (FIG. 3D), already discussed.

Additional Notes and Examples

Example 1 may include an aggregate storage array comprising a plurality of drives, a network controller to receive a hash table and a data payload, wherein the data payload is to be partitioned into a plurality of storage blocks and the hash table is to specify how to index into and individually authenticate the plurality of storage blocks on a per block basis, and logic to authenticate a digital signature of the hash table and the data payload, and conduct a write of the data payload to the plurality of drives in accordance with the hash table.

Example 2 may include the aggregate storage array of Example 1, wherein the plurality of storage blocks are to be compatible with a block size supported by one or more of a data replication policy or an error correction policy of the aggregate storage array.

Example 3 may include the aggregate storage array of Example 1, wherein the write is to reference a single namespace that spans multiple drives in the aggregate storage array.

Example 4 may include the aggregate storage array of Example 1, wherein the hash table is to be authenticated on the per block basis at a drive level of the aggregate storage array based at least in part on a revision number in a header of the data payload.

Example 5 may include the aggregate storage array of any one of Examples 1 to 4, wherein the logic is to determine parity information across the plurality of storage blocks.

Example 6 may include the aggregate storage array of Example 5, wherein the logic is to detect a failure in one or more drives in the aggregate storage array, wherein the write is to include replicating one or more storage blocks in the one or more drives containing the failure across multiple drives in the aggregate storage array, recover the parity information in response to the failure, and reconstruct the one or more storage blocks in the one or more drives containing the failure based on the recovered parity information.

Example 7 may include at least one computer readable storage medium comprising a set of instructions, which when executed by an aggregate storage array, cause the aggregate storage array to authenticate a digital signature of a hash table and a data payload, wherein the data payload is to be partitioned into a plurality of storage blocks and the hash table is to specify how to index into and individually authenticate the plurality of storage blocks on a per block basis, and conduct a write of the data payload to a plurality of drives in an aggregate storage array in accordance with the hash table.

Example 8 may include the at least one computer readable storage medium of Example 7, wherein the plurality of storage blocks are to be compatible with a block size supported by one or more of a data replication policy or an error correction policy of the aggregate storage array.

Example 9 may include the at least one computer readable storage medium of Example 7, wherein the write is to reference a single namespace that spans multiple drives in the aggregate storage array.

Example 10 may include the at least one computer readable storage medium of Example 7, wherein the hash table is to be authenticated on the per block basis at a drive level of the aggregate storage array based at least in part on a revision number in a header of the data payload.

Example 11 may include the at least one computer readable storage medium of any one of Examples 7 to 10, wherein the instructions, when executed, cause the aggregate storage array to determine parity information across the plurality of storage blocks.

Example 12 may include the at least one computer readable storage medium of Example 11, wherein the instructions, when executed, cause the aggregate storage array to detect a failure in one or more drives in the aggregate storage array, wherein the write is to include replicating one or more storage blocks in the one or more drives containing the failure across multiple drives in the aggregate storage array, recover the parity information in response to the failure, and reconstruct the one or more storage blocks in the one or more drives containing the failure based on the recovered parity information.

Example 13 may include a semiconductor package apparatus comprising a substrate, and logic coupled to the substrate, wherein the logic is implemented in one or more of configurable logic or fixed-functionality hardware logic, the logic to digitally sign a hash table and a data payload, wherein the data payload is to be partitioned into a plurality of storage blocks and the hash table is to specify how to index into and individually authenticate the plurality of storage blocks on a per block basis, and initiate a write of the digitally signed hash table and data payload to an aggregate storage array.

Example 14 may include the semiconductor package apparatus of Example 13, wherein the plurality of storage blocks are to be compatible with a block size supported by one or more of a data replication policy or an error correction policy of the aggregate storage array.

Example 15 may include the semiconductor package apparatus of Example 13, wherein the write is to reference a single namespace that spans multiple drives in the aggregate storage array.

Example 16 may include the semiconductor package apparatus of Example 13, wherein the logic is to conduct a subsequent write of one or more additional storage blocks to the aggregate storage array in accordance with the hash table.

Example 17 may include the semiconductor package apparatus of any one of Examples 13 to 16, wherein the logic is to partition the data payload into the plurality of storage blocks, generate the hash table, and store the hash table and a revision number to a header of the data payload.

Example 18 may include the semiconductor package apparatus of Example 17, wherein the logic is to store include one or more of key information, revision control information or encryption algorithm information to the header.

Example 19 may include at least one computer readable storage medium comprising a set of instructions, which when executed by a computing system, cause the computing system to digitally sign a hash table and a data payload, wherein the data payload is to be partitioned into a plurality of storage blocks and the hash table is to specify how to index into and individually authenticate the plurality of storage blocks on a per block basis, and initiate a write of the digitally signed hash table and data payload to an aggregate storage array.

Example 20 may include the at least one computer readable storage medium of Example 19, wherein the plurality of storage blocks are to be compatible with a block size supported by one or more of a data replication policy or an error correction policy of the aggregate storage array.

Example 21 may include the at least one computer readable storage medium of Example 19, wherein the write is to reference a single namespace that spans multiple drives in the aggregate storage array.

Example 22 may include the at least one computer readable storage medium of Example 19, wherein the instructions, when executed, cause the computing system to conduct a subsequent write of one or more additional storage blocks to the aggregate storage array in accordance with the hash table.

Example 23 may include the at least one computer readable storage medium of any one of Examples 19 to 22, wherein the instructions, when executed, cause the computing system to partition the data payload into the plurality of storage blocks, generate the hash table, and store the hash table and a revision number to a header of the data payload.

Example 24 may include the at least one computer readable storage medium of Example 23, wherein the instructions, when executed, cause the computing device to store one or more of key information, revision control information or encryption algorithm information to the header.

Example 25 may include a method of operating a signature server, comprising digitally signing a hash table and a data payload, wherein the data payload is partitioned into a plurality of storage blocks and the hash table specifies how to index into and individually authenticate the plurality of storage blocks on a per block basis, and initiating a write of the digitally signed hash table and data payload to an aggregate storage array.

Example 26 may include the method of Example 25, wherein the plurality of storage blocks are compatible with a block size supported by one or more of a data replication policy or an error correction policy of the aggregate storage array.

Example 27 may include the method of Example 25, wherein the write references a single namespace that spans multiple drives in the aggregate storage array.

Example 28 may include the method of Example 25, further including conducting a subsequent write of one or more additional storage blocks to the aggregate storage array in accordance with the hash table.

Example 29 may include the method of any one of Examples 25 to 28, further including partitioning the data payload into the plurality of storage blocks, generating the hash table, and storing the hash table and a revision number to a header of the data payload.

Example 30 may include the method of Example 29, further including storing one or more of key information, revision control information or encryption algorithm information to the header.

Example 31 may include a method of operating an aggregate storage array, comprising authenticating a digital signature of a hash table and a data payload, wherein the data payload is partitioned into a plurality of storage blocks and the hash table specifies how to index into and individually authenticate the plurality of storage blocks on a per block basis, and conducting a write of the data payload to a plurality of drives in the aggregate storage array in accordance with the hash table.

Example 32 may include the method of Example 31, wherein the plurality of storage blocks are compatible with a block size supported by one or more of a data replication policy or an error correction policy of the aggregate storage array.

Example 33 may include the method of Example 31, wherein the write references a single namespace that spans multiple drives in the aggregate storage array.

Example 34 may include the method of Example 31, wherein the hash table is authenticated on the per block basis at a drive level of the aggregate storage array based at least in part on a revision number in a header of the data payload.

Example 35 may include the method of any one of Examples 31 to 34, further including determining parity information across the plurality of storage blocks.

Example 36 may include the method of Example 35, further including detecting a failure in one or more drives in the aggregate storage array, wherein the write includes replicating one or more storage blocks in the one or more drives containing the failure across multiple drives in the aggregate storage array, recovering the parity information in response to the failure, and reconstructing the one or more storage blocks in the one or more drives containing the failure based on the recovered parity information.

Example 37 may include a signature server apparatus comprising means for performing the method of any one of Examples 25 to 29.

Example 38 may include an aggregate storage array comprising means for performing the method of any one of Examples 31 to 34.

Technology described herein may therefore provide authenticated writes to logical volumes composed of multiple, aggregated storage volumes. Accordingly, storage appliances may have enhanced resilience against malware attacks. Technology described herein may also enable robust and secure recovery of data contained within an aggregate logical volume when one or many of the physical member disks have failed.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An aggregate storage array comprising:
a power supply to provide power to the aggregate storage array;
a plurality of drives;
a network controller to receive a hash table and a data payload, wherein the data payload is to be partitioned into a plurality of storage blocks and the hash table is to specify how to index into the plurality of storage blocks on a per block basis to narrow down data authentication granularity to a single block within the plurality of storage blocks; and
logic to:
authenticate a digital signature of the hash table and the data payload, and
conduct a write of the data payload to the plurality of drives in accordance with the hash table.

2. The aggregate storage array of claim 1, wherein the plurality of storage blocks are to be compatible with a block size supported by a data replication policy and an error correction policy of the aggregate storage array.

3. The aggregate storage array of claim 1, wherein the write is to reference a single namespace that spans multiple drives in the aggregate storage array.

4. The aggregate storage array of claim 1, wherein the hash table is to be authenticated on the per block basis at a drive level of the aggregate storage array based at least in part on a revision number in a header of the data payload.

5. The aggregate storage array of claim 1, wherein the logic is to determine parity information across the plurality of storage blocks.

6. The aggregate storage array of claim 5, wherein the logic is to:
detect a failure in one or more drives in the aggregate storage array, wherein the write is to include replicating one or more storage blocks in the one or more drives containing the failure across multiple drives in the aggregate storage array;
recover the parity information in response to the failure; and
reconstruct the one or more storage blocks in the one or more drives containing the failure based on the recovered parity information,
wherein the authentication of the digital signature is performed in an absence of a bidirectional encryption session between each of the plurality of drives and any component performing write operations.

7. At least one computer readable storage medium comprising a set of instructions, which when executed by an aggregate storage array, cause the aggregate storage array to:
authenticate a digital signature of a hash table and a data payload, wherein the data payload is to be partitioned into a plurality of storage blocks and the hash table is to specify how to index into the plurality of storage blocks on a per block basis to narrow down data authentication granularity to a single block within the plurality of storage blocks; and
conduct a write of the data payload to a plurality of drives in an aggregate storage array in accordance with the hash table.

8. The at least one computer readable storage medium of claim 7, wherein the plurality of storage blocks are to be compatible with a block size supported by a data replication policy and an error correction policy of the aggregate storage array.

9. The at least one computer readable storage medium of claim 7, wherein the write is to reference a single namespace that spans multiple drives in the aggregate storage array.

10. The at least one computer readable storage medium of claim 7, wherein the hash table is to be authenticated on the per block basis at a drive level of the aggregate storage array based at least in part on a revision number in a header of the data payload.

11. The at least one computer readable storage medium of claim 7, wherein the instructions, when executed, cause the aggregate storage array to determine parity information across the plurality of storage blocks.

12. The at least one computer readable storage medium of claim 11, wherein the instructions, when executed, cause the aggregate storage array to:
detect a failure in one or more drives in the aggregate storage array, wherein the write is to include replicating one or more storage blocks in the one or more drives containing the failure across multiple drives in the aggregate storage array;
recover the parity information in response to the failure; and reconstruct the one or more storage blocks in the one or more drives containing the failure based on the recovered parity information,
wherein the authentication of the digital signature is performed in an absence of a bidirectional encryption session between each of the plurality of drives and any component performing write operations.

13. A semiconductor package apparatus comprising:
a substrate; and
logic coupled to the substrate, wherein the logic is implemented in one or more of configurable logic or fixed-functionality hardware logic, the logic to:
digitally sign a hash table and a data payload, wherein the data payload is to be partitioned into a plurality of storage blocks and the hash table is to specify how to index into the plurality of storage blocks on a per block basis to narrow down data authentication granularity to a single block within the plurality of storage blocks; and
initiate a write of the digitally signed hash table and data payload to an aggregate storage array.

14. The semiconductor package apparatus of claim 13, wherein the plurality of storage blocks are to be compatible with a block size supported by a data replication policy and an error correction policy of the aggregate storage array.

15. The semiconductor package apparatus of claim 13, wherein the write is to reference a single namespace that spans multiple drives in the aggregate storage array.

16. The semiconductor package apparatus of claim 13, wherein the logic is to conduct a subsequent write of one or more additional storage blocks to the aggregate storage array in accordance with the hash table.

17. The semiconductor package apparatus of claim 13, wherein the logic is to:
partition the data payload into the plurality of storage blocks;
generate the hash table; and
store the hash table and a revision number to a header of the data payload,
wherein the authentication of the digital signature is performed in an absence of a bidirectional encryption session between each of the plurality of drives and any component performing write operations.

18. The semiconductor package apparatus of claim 17, wherein the logic is to store include one or more of key information, revision control information or encryption algorithm information to the header.

19. At least one computer readable storage medium comprising a set of instructions, which when executed by a computing system, cause the computing system to:
digitally sign a hash table and a data payload, wherein the data payload is to be partitioned into a plurality of storage blocks and the hash table is to specify how to index into the plurality of storage blocks on a per block basis to narrow down data authentication granularity to a single block within the plurality of storage blocks; and
initiate a write of the digitally signed hash table and data payload to an aggregate storage array.

20. The at least one computer readable storage medium of claim 19, wherein the plurality of storage blocks are to be compatible with a block size supported by a data replication policy and an error correction policy of the aggregate storage array.

21. The at least one computer readable storage medium of claim 19, wherein the write is to reference a single namespace that spans multiple drives in the aggregate storage array.

22. The at least one computer readable storage medium of claim 19, wherein the instructions, when executed, cause the computing system to conduct a subsequent write of one or more additional storage blocks to the aggregate storage array in accordance with the hash table.

23. The at least one computer readable storage medium of claim 19, wherein the instructions, when executed, cause the computing system to:
partition the data payload into the plurality of storage blocks;
generate the hash table; and
store the hash table and a revision number to a header of the data payload,
wherein the authentication of the digital signature is performed in an absence of a bidirectional encryption session between each of the plurality of drives and any component performing write operations.

24. The at least one computer readable storage medium of claim 23, wherein the instructions, when executed, cause the computing system to store one or more of key information, revision control information or encryption algorithm information to the header.

* * * * *